United States Patent [19]
Myerson et al.

[11] Patent Number: 5,855,645
[45] Date of Patent: Jan. 5, 1999

[54] PRODUCTION OF MORE CONCENTRATED IRON PRODUCT FROM INDUSTRIAL WASTE MATERIALS STREAMS

[75] Inventors: Allan S. Myerson, Brooklyn, N.Y.; Charles W. Sanzenbacher, Charlotte, N.C.; Peter Robinson, Fergus, Canada; Charles A. Burrows, Atlantic; Paul R. DiBella, Ball Ground, both of Ga.

[73] Assignee: Metals Recycling Technologies Corp., Atlantic, Ga.

[21] Appl. No.: 687,650

[22] Filed: Jul. 26, 1996

Related U.S. Application Data

[63] Continuation-in-part of Ser. No. 670,454, Jun. 26, 1996, which is a continuation-in-part of Ser. No. 594,349, Jan. 29, 1996, Ser. No. 439,352, May 11, 1995, Pat. No. 5,759,503, Ser. No. 380,950, Jan. 31, 1995, Pat. No. 5,582,631, and Ser. No. 360,394, Dec. 21, 1994, Pat. No. 5,571,306, which is a continuation-in-part of Ser. No. 348,446, Dec. 2, 1994, abandoned, which is a continuation-in-part of Ser. No. 238,250, May 4, 1994, Pat. No. 5,464,596, which is a continuation-in-part of Ser. No. 953,645, Sep. 29, 1992, abandoned, which is a continuation-in-part of Ser. No. 820,987, Jan. 15, 1992, Pat. No. 5,208,004, said Ser. No. 594,349, is a continuation-in-part of Ser. No. 439,352, and Ser. No. 348,466, each is a continuation-in-part of Ser. No.238,250, said Ser. No. 380,950, is a continuation-in-part of Ser. No. 594,349.

[51] Int. Cl.⁶ .................................................. C21B 13/14
[52] U.S. Cl. ................ 75/419; 75/436; 75/500; 75/504; 75/585; 75/961
[58] Field of Search ............................. 75/416, 419, 436, 75/504, 724, 961, 500, 585

[56] References Cited

U.S. PATENT DOCUMENTS

| | | | |
|---|---|---|---|
| 4,389,040 | 6/1983 | Ulrich et al. | 266/137 |
| 4,765,829 | 8/1988 | Beckmann et al. | 423/97 |
| 5,667,553 | 9/1997 | Keegel Jr. | 75/420 |
| 5,667,555 | 9/1997 | Myerson et al. | 75/10.63 |

*Primary Examiner*—Melvyn Andrews
*Attorney, Agent, or Firm*—Deveau, colton & Marquis

[57] ABSTRACT

A method for producing a more concentrated iron product from an industrial waste materials stream comprising iron and non-iron constituents such as EAF and basic oxygen furnace dust generally comprising the steps of compacting or briquetting the waste materials stream, roasting the waste materials stream at temperatures above about 980° C. to convert the iron compounds to direct reduced iron, crushing the roasted waste materials stream, separating the iron compounds contained in the waste materials stream by magnetic separation or flotation, and providing the iron compounds back to the EAF or basic oxygen furnace.

25 Claims, 2 Drawing Sheets

PRODUCTION OF MORE CONCENTRATED IRON PRODUCT FROM INDUSTRIAL WASTE MATERIALS STREAMS

STATEMENT OF RELATED APPLICATIONS

This application is a continuation-in-part of application Ser. No. 08/670,454, filed Jun. 26, 1996, currently pending, which is a continuation-in-part of (1) application Ser. No. 08/594,349, filed on Jan. 29, 1996, currently pending, which is a continuation-in-part of application Ser. No. 08/439,352, filed May 11, 1995, now U.S. Pat. No. 5,759,503, which is a continuation-in-part of application Ser. No. 08/238,250, filed May 4, 1994, issued as U.S. Pat. No. 5,464,596, which is a continuation-in-part of application Ser. No. 07/953,645, filed Sep. 29, 1992, now abandoned, which is a continuation-in-part of application Ser. No. 07/820,987, filed Jan. 15, 1992, issued as U.S. Pat. No. 5,208,004; (2) of application Ser. No. 08/439,352, filed on May 11, 1995, now U.S. Pat. No. 5,759,503, which is a continuation-in-part of application Ser. No. 08/238,250, filed May 4, 1994, issued as U.S. Pat. No. 5,464,596, which is a continuation-in-part of application Ser. No. 07/953,645, filed Sep. 29, 1992, now abandoned, which is a continuation-in-part of application Ser. No. 07/820,987, filed Jan. 15, 1992, issued as U.S. Pat. No. 5,208,004; (3) of application Ser. No. 08/380,950, filed on Jan. 31, 1995, issued as U.S. Pat. No. 5,582,631, which is a continuation-in-part of application Ser. No. 08/594,349, filed on Jan. 29, 1996, currently pending, which is a continuation-in-part of application Ser. No. 08/348,446, filed Dec. 2, 1994, now abandoned, which is a continuation-in-part of application Ser. No. 08/238,250, filed May 4, 1994, issued as U.S. Pat. No. 5,464,596, which is a continuation-in-part of application Ser. No. 07/953,645, filed Sep. 29, 1992, now abandoned, which is a continuation-in-part of application Ser. No. 07/820,987, filed Jan. 15, 1992, issued as U.S. Pat. No. 5,208,004; and (4) of application Ser. No. 08/360,394, filed on Dec. 21, 1994, issued as U.S. Pat. No. 5,571,306, which is a continuation-in-part of application Ser. No. 08/348,446, filed Dec. 2, 1994, now abandoned which is a continuation-in-part of application Ser. No. 08/238,250, filed May 4, 1994, issued as U.S. Pat. No. 5,464,596, which is a continuation-in-part of application Ser. No. 07/953,645, filed Sep. 29, 1992, now abandoned, which is a continuation-in-part of application Ser. No. 07/820,987, filed Jan. 15, 1992, issued as U.S. Pat. No. 5,208,004.

BACKGROUND OF THE INVENTION

The present invention relates generally to a process for the recovery of an economically valuable concentrated iron product, useful as the feedstock for the iron and steel making processes, from industrial waste streams typically comprising heavy materials, such as iron oxide, cadmium, zinc and lead, and light materials, such as lime and ash. A waste materials stream comprising iron oxide, cadmium, zinc, lead, silica, lime and ash, such as electric arc furnace (EAF) dust or blast furnace dust, is subjected to a combination of steps including compaction, separation of the iron oxide from other materials in the waste materials stream by flotation or magnetic separation either before or after compaction, roasting the materials in a reduction furnace, such as a rotary hearth furnace, and crushing the roasted materials. The other materials in the waste stream from which the iron oxide is separated also can be treated further to recover other chemical and metal values, as disclosed below.

During the process, fumes and other wastes are exhausted which typically comprise lead, zinc and cadmium. These fumes and other waste can be processed by a baghouse or/and by a wet scrubber or other capturing device. The captured materials can be recycled to a recovery process wherein the captured materials are introduced into a leaching process which causes the zinc, cadmium, and lead constituents to go into solution while the iron and iron oxide which was not removed during the separation process remains undissolved. Any undissolved iron and iron oxide can be recycled to the process of the present invention, specifically to the compacting step.

There exists a need for a method which will allow the recovery of an iron product from industrial waste streams which can be subjected to further treatments, resulting in a relatively pure iron product, such as direct reduced iron, and/or a very pure iron product, such as pig iron, which can be used as the feedstock for other processes, such as a steel making process. The industrial waste streams of most interest for this invention include a typical electric arc furnace waste and basic oxygen furnace streams and the particulate matter filtered or otherwise removed from various substeps of the invention, particularly from the fumes of a reduction furnace, such as a rotary hearth furnace, or from the small scale blast furnace or cupola furnace. Producing an iron product with a minimum amount of impurities, such as zinc ferrite, lead and cadmium, is advantageous because the iron product can be used as the feedstock for steel production processes.

A method which results in the recovery of an iron product has additional value in that the iron product can be sold for use in other processes. Furthermore, recovery and retreatment of exhaust and other waste products from the present invention and from other processes and subprocesses has a beneficial effect on the environment, and a beneficial, economic effect on the cost of the steel making process. The exhaust may be further processed by filtering it through a bag house to capture the particulate materials, and then subjecting the captured materials to leaching to recover the iron and iron oxide which was not separated out during the separation step. The iron materials then can be compacted and sent to a reduction furnace or a blast furnace.

Iron is smelted, or refined, in a furnace in which iron ore, coke and limestone are heated. Scrap iron also can be used as a feed to the iron smelting furnace. Prior to introducing scrap iron to the furnace, it is de-scaled of iron oxide, or rust. The mill scale, as it is called, is a waste product typically disposed of and not used in the iron production process. Steel is basically an iron alloyed with other chemical elements. Scrap steel also can be used as a feed in the making of steel. Mill scale also is not used in the steel production process. Finding an economical and/or beneficial use for this mill scale would provide iron and steel mills an opportunity to dispose of the mill scale. Likewise, used batteries provide a waste disposal problem. Used batteries also are not typically used in the steel making process. Rather than disposal in a landfill, it generally is preferable to recycle the used batteries, which are rich in iron oxide. Finding an economical and/or beneficial use for used batteries would reduce the quantity of such material sent to landfills and provide a recycle for usable components. All of these iron oxide rich materials can be added to the waste stream feed which is fed into the present process.

As can be seen, there exists a need for a method which separates iron oxide from other materials contained in a waste stream and processes the iron oxide to create DRI and/or pig iron and which will allow exhausts and fumes from reduction or pig iron furnaces or the like to be filtered in a baghouse or/and a wet scrubber so that the iron oxide which was not recovered during the separation step can be recovered by leaching the captured materials and recycled back to the process of the present invention. This need is addressed by the present invention.

BRIEF SUMMARY OF THE INVENTION

In accordance with the present invention, a waste material combination typically comprising iron oxide, cadmium, zinc, lead, ash and lime is subjected to a series of steps including compaction, roasting, crushing and separation. The preferred waste material combination is EAF dust, or other furnace dusts from metals processing processes. To the dust, other waste materials can be added. For example, iron-rich wastes such as mill scale or used batteries, iron-poor wastes such as wastes from industrial processes, and other wastes containing economically valuable constituents may be added to the dust for recovery of the metals and chemicals values.

Two basic series of steps are contemplated by this invention. The first series comprises subjecting the waste materials stream to a first compacting process whereby the waste materials stream is compacted with a reductant such as carbon into a compacted waste materials stream; roasting the compacted waste materials stream to a temperature greater than about 980° C. to convert at least a portion of the iron compounds in the waste materials stream into a direct reduced iron product comprising iron and non-iron compounds and fuming off at least a portion of the non-iron compounds; providing the direct reduced iron product to a crushing process whereby at least a portion of the direct reduced iron product is crushed into particles of one-half inch mesh size or smaller; subjecting the direct reduced iron product to a separation process whereby a first portion of the direct reduced iron product comprising a portion of the iron compounds is separated from the remainder of the direct reduced iron product comprising a portion of the iron and the non-iron compounds; and then recovering the first portion of the direct reduced iron prodcut as the more concentrated iron product.

The second series comprises subjecting the waste materials stream to a separation process whereby a first portion of the waste materials stream comprising a portion of the iron compounds is separated from the remainder of the waste materials stream comprising a portion of the iron and the non-iron compounds; subjecting the waste materials stream to a first compaction process whereby the waste materials stream is compacted into a compacted waste materials stream; roasting the compacted waste materials stream to a temperature greater than about 980° C. to convert at least a portion of the iron compounds in the waste materials stream into a direct reduced iron product comprising iron and non-iron compounds and fuming off at least a portion of the non-iron compounds; providing the direct reduced iron product to a crushing process whereby at least a portion of the direct reduced iron product is crushed into particles of one-half inch mesh size or smaller; and then recovering the first portion of the direct reduced iron product as a more concentrated iron product.

The preferred separation processes are magnetic separatiuon and flotation separation. If flotation is used, the heavy materials such as iron oxide, cadmium, zinc and lead sink to the bottom of the liquid suspension used in the flotation process while the lighter materials such as lime and ash cling to bubbles produced by passing air through the suspension and are removed as a froth product. The light products such as lime and ash, which also may contain some iron and other compounds, are leached and the majority of the non-iron compounds either go into solution or float on top of the solution, whereas any iron oxide contained in the material being leached remains undissolved and sinks.

If magnetic separation is used, the iron-based materials are magnetically separated from the non-iron materials. It is possible that some iron-based materials will remain with the non-iron materials even after magnetic separation. The non-iron products can be sent to a leaching process to separate any iron or iron oxide from the non-iron materials. Any iron or iron oxide which remains with the substantially non-iron materials does not go into solution and is subsequently separated and can be sent back to the compacting process.

When the waste material is roasted, fumes are released which can be captured in a bag house. The captured materials, which generally comprise lead, zinc and cadmium, then can be leached as discussed above, and the undissolved iron oxide can be recycled to the compacting process. The non-iron products and compounds then are subjected to further recovery steps for recovering metals and chemicals values.

Therefore, it is an object of the present invention to provide a method for recovering a concentrated iron product from an industrial waste stream, such as EAF and blast furnace dust.

It is yet another object of the present invention to provide a method for recovering a concentrated iron product which can be used as is as a feedstock for a steel making process.

It is yet another object of the present invention to provide a process which uses the waste streams of various industrial processes, particularly the iron and steel making processes, so as to achieve an economical, environmentally friendly recycle process in the iron or steel making industry.

These and other objects of the present invention will become apparent from the following detailed description, drawings and claims.

DETAILED DESCRIPTION OF THE PREFERRED EMBODIMENTS

Figure 1:
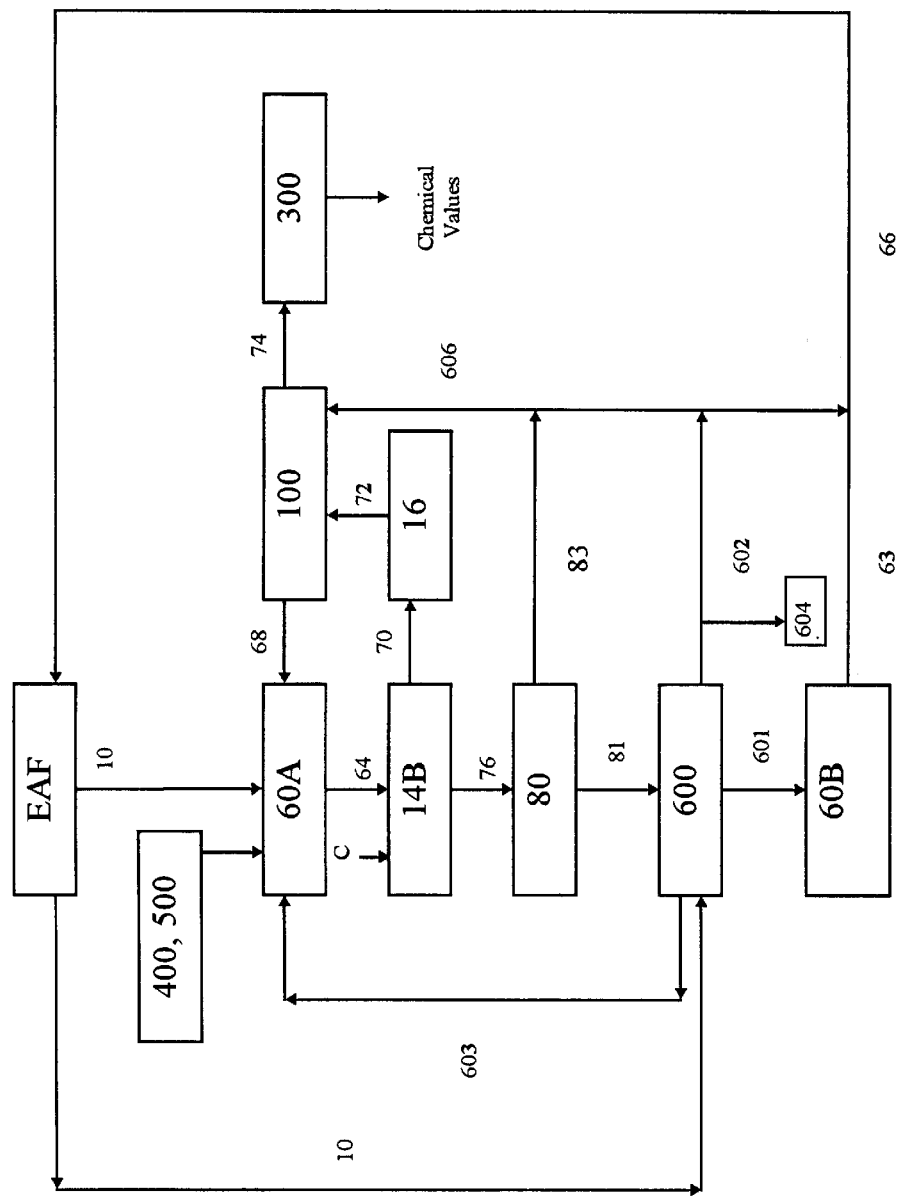
FIG. 1 is a schematic block diagram illustrating the process of the present invention.

The preferred embodiment of the present invention will now be described with reference to FIG. 1. The first series of steps comtemplated by this invention comprise the basic path of sending the waste stream 10 first to the compactor 60A, then to the reduction furnace 14B, then to the crusher 80, and then to the separator 600. A second compactor 60B can be included after the separator 600. The second series of steps contemplated by this invention comprise the basic path of sending the waste stream to the separator 600, then to the compactor 60A, then to the reduction furnace 14B, and then to the crusher 80. The separated, more concentrated iron product, 602 or 83, respectively, then can be used as the feedstock for the ironmaking and steelmaking processes.

The first method for producing a more concentrated iron product from an iron-bearing waste materials stream generated from a steelmaking or ironmaking furnace, which waste materials stream comprises iron compounds and non-iron compounds, comprises the steps of:

a. subjecting the waste materials stream 10 to a first compacting process 60A whereby the waste materials stream is compacted into a compacted waste materials stream 64;

b. roasting 14B the compacted waste materials stream 64 to a temperature greater than about 980° C. to convert at least a portion of the iron compounds in the waste materials stream into a direct reduced iron product 76 comprising iron and non-iron compounds and fuming off at least a portion of the non-iron compounds 70;

c. providing the direct reduced iron product 76 to a crushing process 80 whereby at least a portion of the direct reduced iron product 76 is crushed into particles 81 of one-half inch mesh size or smaller;

d. subjecting the crushed direct reduced iron product 81 to a separation process 600 whereby a first portion 602 of the direct reduced iron product comprising a portion of the iron compounds is separated from the remainder 604 of the direct reduced iron product (which comprises a portion of the iron and the non-iron compounds); and then e. recovering the first portion 602 of the direct reduced iron product as the more concentrated iron product 66, and discarding or recycling the remainder 604, or recycling the first portion 602 to the leaching process 100 for further consideration.

In the first series of steps, the waste materials stream first is sent to a compacting process where the waste materials are compacted into pellets of a predetermined size. The pellets then are sent to the reduction furnace 14B where they are converted into a direct reduced iron product. During the reduction process, fumes 70 are exhausted which typically comprise lead, zinc and cadmium. The fumes 70 are captured in a capture means 16, such as a baghouse or scrubber. The captured product 72 then is sent to leaching process 100. The undissolved iron oxide 68 resulting from the leaching process 100 then is recycled to the compacting process 60. The materials which go into solution during the leaching process 100 constitute other values 74 which are recovered and may be further treated or used in other processes, such as subprocess 300.

The direct reduced iron product then is sent to a crusher 80 where they are ground into smaller pieces. The small pieces are introduced to the separation step 600 where iron compounds remaining may be separated from non-iron compounds, and the non-iron compounds sent back to the compacting step 60 or the leaching step 100. This step increases the iron concentration. The iron compounds then can be sent to a second compactor 60B for further compaction, to the leaching step 100 for further concentration, to another furnace also for further concentration, or to the ironmaker or steelmaker as the feedstock for the ironmaking or steelmaking process.

The first method can further comprise the additional steps of subjecting at least a portion 601 of the first portion of the direct reduced iron product to a second compaction process 60B resulting in a compacted concentrated product 63, providing at least a protion of the crushed waste materials stream 83 directly to an electric arc furnace or another furnace, and/or capturing at least a portion of the non-iron compounds 606 and subjecting the captured non-iron compounds 606 to subsequent processing steps 100, 300 to recover chemical and metal values. These subsequent processing steps can include leaching the captured non-iron compounds 606 in a solution selected from the group consisting of ammonium chloride, sodium hydroxide, ammonium sulfate, ammonia/ammonium hydroxide, ammonium phosphate, potassium hydroxide, ammonia/ammonium oxalate, and ammonia/ammonium carbonate solutions. Further processing of leached compounds 74 also can be employed. Any iron compounds 68 can be recycled to the compacting process 60A.

The first compaction process 60A preferably operates at a temperature of between approximately 10° C. and 250° C., although operation outside of this temperature range is acceptable. A carbon compound C generally is added to the waste materials stream during the first compaction process 60A. The first compaction process 60A can be a briquetting process. The first portion of the direct reduced iron product 76 alternatively can be provided to another furnace (not shown), wherein the first portion of the direct reduced iron product 76 is heated to a temperature sufficient to liquefy the first portion of the direct reduced iron product, and removing at least a portion of any non-iron compounds contained in the first portion of the direct reduced iron product stream as slag. Likewise, the first portion of the direct reduced iron product 76 can be provided to a steelmaker for use as an iron feedstock in the production of iron-based products.

The second method for producing a more concentrated iron product from an iron-bearing waste materials stream generated from a steelmaking or ironmaking furnace, which waste materials stream comprises iron compounds and non-iron compounds, is a rearrangement of the first method, and comprises the steps of:

a. subjecting the waste materials stream 10 to a separation process 600 whereby a first portion 603 of the waste materials stream 10 comprising a portion of the iron compounds is separated from the remainder 604 of the direct reduced iron product comprising a portion of the iron and the non-iron compounds;

b. subjecting the first portion 603 to a first compaction process 60A whereby the waste materials stream is compacted into a compacted waste materials stream 64;

c. roasting 14B the compacted waste materials stream 64 to a temperature greater than about 980° C. in a reducing atmosphere to convert at least a portion of the iron compounds in the waste materials stream into a direct reduced iron product 76 comprising iron and non-iron compounds and fuming off at least a portion of the non-iron compounds 70;

d. providing the direct reduced iron product 76 to a crushing process 80 whereby at least a portion of the direct reduced iron product 76 is crushed into particles 83 of one-half inch mesh size or smaller; and then e. recovering the crushed direct reduced iron product 83 as a more concentrated iron product 63.

In the second series of steps, the waste materials stream first is sent to the separation process where iron compounds remaining may be separated from non-iron compounds, and the non-iron compounds sent to the leaching step 100. This step increases the iron concentration. The iron compounds then are sent to the compacting process where the waste materials are compacted into pellets of a predetermined size. The pellets then are sent to the reduction furnace 14B where they are converted into a direct reduced iron product. During the reduction process, fumes 70 are exhausted which typically comprise lead, zinc and cadmium. The fumes 70 are captured in a capture means 16, such as a baghouse or scrubber. The captured product 72 then is sent to leaching process 100. The undissolved iron oxide 68 resulting from the leaching process 100 then is recycled to the compacting process 60. The materials which go into solution during the leaching process 100 constitute other values 74 which are recovered and may be further treated or used in other processes, such as subprocess 300.

The direct reduced iron product then is sent to a crusher 80 where they are ground into smaller pieces. The small pieces of concentrated iron product then can be sent to the leaching step 100 for further concentration, to the EAF furnace also for further concentration, or to the ironmaker or steelmaker as the feedstock for the ironmaking or steelmaking process.

The second method also can comprise the additional steps of providing at least a portion of the crushed direct reduced iron product directly to an electric arc furnace or another furnace and/or capturing at least a portion of the non-iron compounds and subjecting the captured non-iron compounds to subsequent processing steps to recover chemical and metal values, as well as the other side processes mentioned above.

An apparatus (details not shown, but within the ability of one skilled in the art after reading this specification) for producing this more concentrated iron product from an iron-bearing waste materials stream generated from a steelmaking or ironmaking furnace, which waste materials stream comprises iron compounds and non-iron compounds, also is contemplated. The apparatus for carrying out the first method comprises:

a. means for compacting the waste materials whereby the waste materials stream is compacted into a compacted waste materials stream;

b. roasting means for converting at least a portion of the iron compounds in the compacted waste materials stream into a direct reduced iron product;

c. means for crushing the direct reduced iron product whereby at least a portion of the direct reduced iron product is crushed into particles of one-half inch mesh size or smaller; and d. means for separating a first portion of the crushed direct reduced iron product from the remainder of the direct reduced iron product.

The apparatus can further comprise means for leaching the remainder of the waste materials stream such that a portion of the non-iron compounds goes into solution and the iron compounds do not go into solution. The leachant is selected from the group consisting of aqueous solutions of ammonium chloride, sodium hydroxide, ammonium sulfate, ammonia/ammonium hydroxide, ammonium phosphate, potassium hydroxide, ammonia/ammonium oxalate, and ammonia/ammonium carbonate solutions.

The apparatus for carrying out the second method comprises:

a. means for separating a first portion of the waste materials stream comprising a portion of the iron compounds from the remainder of the waste materials stream comprising a portion of the iron and the non-iron compounds; and b. means for compacting the first portion of the waste materials stream whereby the first portion of the waste materials stream is compacted into a compacted waste materials stream;

c. roasting means for converting at least a portion of the iron compounds in the compacted waste materials stream into a direct reduced iron product; and d. means for crushing the direct reduced iron product whereby at least a portion of the direct reduced iron product is crushed into particles of one-half inch mesh size or smaller.

The apparatus also can further comprise means for leaching the remainder of the waste materials stream such that a portion of the non-iron compounds goes into solution and the iron compounds do not go into solution.

Figure 2:
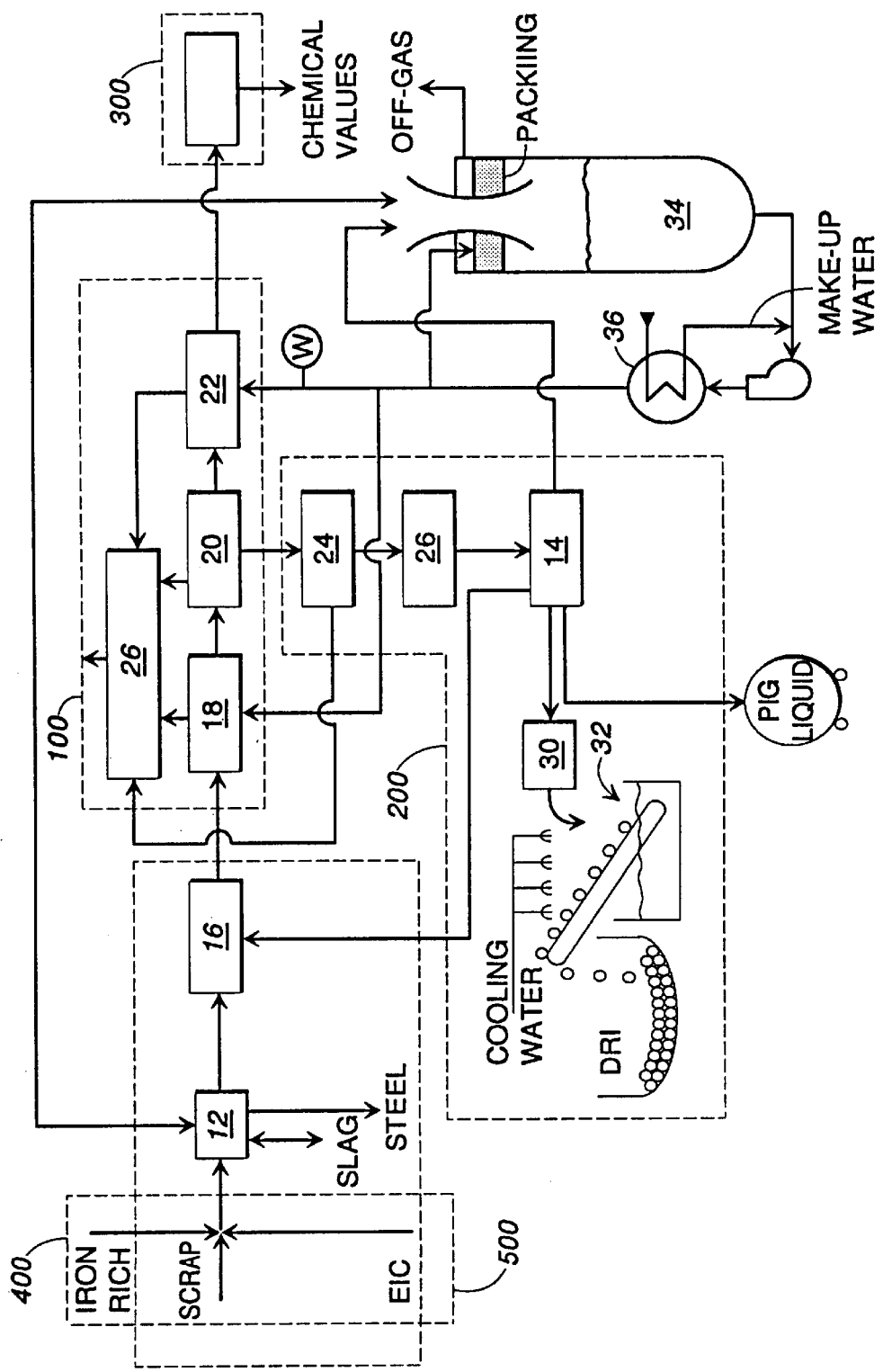
FIG. 2 is a schematic block diagram illustrating where the process of the present invention fits in in the overall recycle and recovery process for industrial waste streams.

A waste material stream 10 such as EAF dust typically comprises iron oxide, cadmium, zinc, lead, lime and ash. Waste material stream 10 may be the stream from subprocesses 400 and 500 as described below and in other related patent specifications, and as shown in FIG. 2. The present process generally replaces subprocess 100 and part of subprocess 200 shown in FIG. 2.

The separation process can be either flotation separation or magnetic separation. When flotation is used, the heavy materials which generally comprise iron oxide, cadmium, zinc and lead sink to the bottom of the liquid suspension whereas the light materials which typically comprise lime, ash and silica cling to bubbles produced by passing air through the liquid suspension and are removed as a froth product. The light materials separated during the flotation step are sent to a leaching process, such as subprocess 100, where they are leached with an ammonium chloride or sodium hydroxide solution. During the leaching process, any iron oxide contained in the light materials does not go into solution whereas other materials such as zinc, lead and cadmium compounds dissolve. Still other materials, such as the lights (lime and ash), do not go into solution, but float on the top of the solution. The undissolved iron oxide 68 then is separated from the solution and the lights and sent to the compacting process 60.

When magnetic separation is used, most of the iron-based products are separated from the non-iron products. The substantially non-iron product (which may contain some iron product) is sent to a leaching process, such as subprocess 100. During the leaching process, the iron oxide does not go into solution whereas certain non-iron products dissolve. The undissolved iron oxide 68 then is sent to the compacting process 60.

PREFERRED EMBODIMENT AS COUPLED WITH A COMPLETE IRON PRODUCT AND CHEMICAL VALUES RECOVERY AND RECYCLE METHOD

The present invention also can be coupled to the complete process shown in FIG. 2 and disclosed in more detail below for the recovery of other usable economically valuable products. Primary recovery and recycle processes are disclosed and claimed in patents and patent applications filed by the present inventors and assigned to the assignee of this invention and specification.

Fumes and other non-iron compound exhausted from the furnace and other processing steps and means of the present invention can be processed by a baghouse or/and by a wet scrubber or other capturing means and the captured materials are then recycled. Fumes emanating from the furnace contain particulate matter, and may include potentially valuable zinc, cadmium, and lead constituents. The fumes are filtered in a. The filter cake, which is an iron-poor mixture, may be combined with the initial waste feed (such as EAF dust) to this general process and/or other iron-rich materials, and processed further.

An alternative method of removing the particulate matter from the exhausts is the use of a wet scrubber, such as a venturi scrubber. The exhaust constituents soluble in water will be removed from the exhaust by the recirculated water. The loaded recirculated water then may be introduced to an ammonium chloride or sodium hydroxide leach step. Alternatively, the wet scrubber can use an ammonium chloride or sodium hydroxide solution instead of water. The particulate matter soluble in ammonium chloride, such as for example zinc, cadmium, and lead constituents, or in sodium hydroxide, will be removed in the ammonium chloride solution or sodium hydroxide solution, respectively, in the wet scrubber. The loaded ammonium chloride solution or sodium hydroxide solution then can be combined with the leaching step discussed above, resulting in an exceptional increase in the recycle of waste streams from, for example, the steel making process. Recovery and retreatment of exhaust and other waste products from the present invention and from other processes and subprocesses has a beneficial effect on the environment, and a beneficial, economic effect on the cost of the steel making process.

Scrap iron also can be combined with waste materials stream 10. Prior to introducing scrap iron, it is de-scaled of iron oxide, or rust. The mill scale, as it is called, is a waste product typically disposed of and not used in the iron production process. Steel is basically an iron alloyed with other chemical elements. Scrap steel also can be used as a feed in the making of steel. Mill scale also is not used in the steel production process. Finding an economical and/or beneficial use for this mill scale would provide iron and steel mills an opportunity to dispose of the mill scale. Likewise, used batteries provide a waste disposal problem. Used batteries also are not typically used in the steel making process. Rather than disposal in a landfill, it generally is preferable to recycle the used batteries, which are rich in iron oxide. Finding an economical and/or beneficial use for used batteries would reduce the quantity of such material sent to landfills and provide a recycle for usable components. All of these iron oxide rich materials can be added to the waste materials stream 10 which is fed into the present process. Additionally, iron-poor materials can be added to the waste materials stream 10 for the present invention. Iron-poor materials comprising chemical values recoverable in the present process can be added, resulting in the recycle of waste streams which otherwise would be disposed of in, for example, landfills, and the recovery of chemical values which otherwise would be wasted.

The preferred iron-poor waste feed stream is taken from fumes emanating from industrial processes. For example, fumes from reduction furnaces and from the iron and steel making processes typically are filtered in baghouses. Other industrial processes also produce fumes which may be filtered in baghouses. The waste product removed from the fumes in the baghouses may be subjected to the present process for recovery of chemical values and production of an iron-rich product. Likewise, the fumes emanating from direct-reduced iron reduction furnaces may be filtered, with the filtrate recycled to the present process. Alternatively, the fumes may be cleaned using a recirculating water or ammonium chloride solution wet scrubber. The loaded recirculating water or ammonium chloride solution (the scrubbant) may be recycled to the leach step of the present invention. Alternatively, a sodium hydroxide leach step can be used, depending on the chemical values to be recovered.

The waste material, such as the combination of iron poor materials from a baghouse or wet scrubber and EAF flue dust, is leached using ammonium chloride, and the remaining undissolved precipitate is, for the most part, an iron oxide cake. This iron oxide cake can be sent to the compacting step 60A for processing according to the invention. Iron-rich materials also may be added to be leached and further processed.

A typical industrial waste materials stream 10 is a flue gas where the charge contains galvanized steel, having the following percent composition:

TABLE I

Analysis of Flue Dust

| Component | Percent By Weight |
| --- | --- |
| Zinc Oxide | 39–40 |
| Iron Oxide | 36–37 |
| Lead Oxide | 5–6 |
| Inert Materials | 9–10 |
| Calcium Oxide | 2–3 |
| Potassium Oxide | 2–3 |
| Manganese Oxide | 1–2 |
| Tin Oxide | 1–2 |
| Aluminum Oxide | 0–1 |
| Magnesium Oxide | 0–1 |
| Chromium Oxide | 0–1 |
| Copper Oxide | 0–1 |
| Silver | 0–1 |
| Unidentified Materials | 0–1 |

Referring to FIG. 2, a preferred embodiment of the complete iron products and chemical values recycle and recovery process is shown. Subprocess 100, the digestion and filtration steps, generally comprises the process disclosed and claimed in parent application Ser. No. 08/238,250, which also is disclosed above. Subprocess 200, the direct reduced iron production steps, generally comprises the process disclosed and claimed in parent application Ser. No. 08/348,446, which also is disclosed above. The present process as shown in FIG. 1 generally replaces subprocesses 100 and 200, with subprocess 100 being used as a side recovery process for zinc and other chemical and metal values. Subprocess 300, the chemical values recovery steps, when combined with subprocess 100, generally comprises the process disclosed and claimed in parent application Ser. No. 08/302,179, which also is disclosed above. Subprocess 400, the enhanced direct reduced iron production steps, when combined with subprocess 200, generally comprises the process disclosed and claimed in parent application Ser. No. 08/360,394, which also is disclosed above.

Subprocess 500 comprises a feed process to the present invention. Feed streams such as iron poor waste fume streams from electric arc furnaces 12 and other furnaces such as reduction furnaces or smelters are filtered in a capture means 16, such as a baghouse or scrubber. Other feed streams such as iron rich direct reduced iron and pig iron, as well as scrap iron and steel, are subjected to the iron or steel making process. Exhaust fumes from such processes, which typically include an electric arc furnace or other reduction furnace, also can be filtered in a capture means 16. The constituents filtered out in capture means 16 comprise a waste feed to subprocess 100.

In subprocess 100, for recovering chemical and metal values from the exhausts 70 from the present process, the exhausts are leached in digester 18 with ammonium chloride, preferably at approximately 90° C. and approximately 23% by weight concentration. Constituents soluble in ammonium chloride go into solution, while constituents insoluble in ammonium chloride, such as iron oxides, precipitate out. The precipitates are filtered from the solution in filter 20. The filtered solution is sent to cementer 22, and subjected to subprocess 300 to recover other chemical values. The precipitate, which is an iron cake (IC), can be sent to the comapcing step 60A.

In a full subprocess 200, the precipitate is dried and crushed in dryer/crusher 24. Exhaust gases from dryer/crusher 24 may be sent to a capture means 16 such as baghouse, but more typically are sent to an air scrubber such as air scrubber 26 for cleaning, as the exhaust gases from dryer/crusher 24 typically do not have a significant quantity of recoverable constituents. The dried and rushed precipitates can be compacted in a compactor and also sent to a reduction furnace or smelter 14 to produce DRI.

Exhaust fumes from the furnace 14 (or 14A in FIG. 1) can be sent to scrubber 34 (a subset of capture means 16), which preferably is a recirculating wet scrubber using water or an aqueous ammonium chloride solution. Exhaust fumes from EAFs such as EAF 12 also can be sent to scrubber 34. In scrubber 34, the exhaust fumes are scrubbed and the scrubbed off-gas released. The water or aqueous ammonium chloride solution containing the constituents scrubbed from the exhaust fumes is sent either to cementer 22 or digester 18, depending on purity; more pure solutions typically are sent to digester 18, while less pure solutions typically are sent to cementer 22.

In the preferred embodiment, the furnace 12, 14, 14A off-gases comprise ZnO and other particulate impurities. If the off-gases are scrubbed in scrubber 34, the water balance is maintained using a temperature control such as heat exchanger 36. Additionally, the concentration of ZnO and other solubles in the scrubbing liquid may be controlled by the addition of water W to the cementer 22, or ammonium chloride to the scrubber 34. As discussed above, if an ammonium chloride solution is used as the scrubbing liquid, it is preferred to maintain the solution at approximately 90° C. and approximately 23% $NH_4Cl$.

Leaching Treatment

The exhausts can be subjected to an ammonium chloride leach. An ammonium chloride solution in water is prepared in known quantities and concentrations. The majority of the exhausts, including any zinc and/or zinc oxide, lead oxide, cadmium oxide, and other metal oxides, dissolves in the ammonium chloride solution. The iron oxide does not dissolve in the ammonium chloride solution. As an example, the solubility of zinc oxide in ammonium chloride solutions is shown in Table II.

TABLE II

Solubility of ZnO in 23% $NH_4Cl$ solution

| Temperature °C. | g Dissolved/100 g $H_2O$ |
|---|---|
| 90 | 14.6 |
| 80 | 13.3 |
| 70 | 8.4 |
| 60 | 5.0 |
| 50 | 3.7 |
| 40 | 2.3 |

A 23% by weight ammonium chloride solution in water at a temperature of at least 90° C. provides the best solubility for a waste stream comprising a significant quantity of zinc oxide and is preferred. Concentrations of ammonium chloride below about 23% do not dissolve the maximum amount of zinc oxide from the waste material, and concentrations of ammonium chloride above about 23% tend to precipitate out ammonium chloride along with the zinc oxide when the solution is cooled. The iron oxide and inert materials such as silicates will not dissolve in the preferred solution.

The zinc oxide, as well as smaller concentrations of lead or cadmium oxide, are removed from the exhausts by the dissolution in the ammonium chloride solution. The solid remaining after this leaching step can contain iron oxides and some impurities including zinc, lead, cadmium, and possibly some other impurities. The iron oxides can be sent to the compacting sterp 60A, while the non-iron compounds can be sent to the values recovery step 300.

If the iron poor material is removed from the industrial waste stream using a wet scrubber, the preferred wet scrubber is an ammonium chloride solution wet scrubber. By using an ammonium chloride wet scrubber, the loaded scrubbing solution, ammonium chloride, can be combined directly with the ammonium chloride leachant, or sent directly to the cementation step for removal of certain non-iron products. Depending on the degree of loadedness of the ammonium chloride scrubbing solution, pure make-up ammonium chloride solution can be added to increase the effectiveness of the ammonium chloride leachant.

Optional Recovery of Zinc Oxide

To recover the zinc oxide from the product solution in subprocess 300, while the filtered zinc oxide and ammonium chloride solution is still at a temperature of 90° C. or above, finely powdered zinc metal is added to the solution. Through an electrochemical reaction, any lead metal and cadmium in solution plates out onto the surfaces of the zinc metal particles. The addition of sufficient powdered zinc metal results in the removal of virtually all of the lead of the solution. The solution then is filtered to remove the solid lead, zinc and cadmium.

Powdered zinc metal alone may be added to the zinc oxide and ammonium chloride solution in order to remove the solid lead and cadmium. However, the zinc powder typically aggregates to form large clumps in the solution which sink to the bottom of the vessel. Rapid agitation typically will not prevent this aggregation from occurring. To keep the zinc powder suspended in the zinc oxide and ammonium chloride solution, any one of a number of water soluble polymers which act as antiflocculants or dispersants may be used. In addition, a number of surface active materials also will act to keep the zinc powder suspended, as will many compounds used in scale control. These materials only need be present in concentrations of 10–1000 ppm. Various suitable materials include water soluble polymer dispersants, scale controllers, and surfactants, such as lignosulfonates, polyphosphates, polyacrylates, polymethacrylates, maleic anhydride copolymers, polymaleic anhydride, phosphate esters and phosponates. Flocon 100 and other members of the Flocon series of maleic-based acrylic oligomers of various molecular weights of water soluble polymers, produced by FMC Corporation, also are effective. Adding the dispersants to a very high ionic strength solution containing a wide variety of ionic species is anathema to standard practice as dispersants often are not soluble in such high ionic strength solutions.

At this stage there is a filtrate rich in zinc compounds and a precipitate of lead, cadmium and other products. The filtrate and precipitate are separated, with the precipitate being further treated, if desired, to capture chemical values. The filtrate may be treated in several manners, two of which are preferred. First, the filtrate may be cooled resulting in the crystallization and recovery of zinc oxide. Second, the filtrate may be subjected to electrolysis resulting in the generation and recovery of metallic zinc.

To recover zinc oxide, the filtrate then is cooled to a temperature of between about 20° C. and 60° C. resulting in the crystallization of a mixture of zinc compounds. The mixture contains a significant amount of diamino zinc dichloride, or other complex compounds which involves zinc amino complexes, hydrated zinc oxides and hydroxide species. Crystallization helps to achieve a high purity zinc oxide of controlled particle size, typically through control of the temperature-time cooling profile. Reverse natural cooling, that is cooling the solution slower at the beginning of the cooling period and faster at the end of the cooling period, is preferred to control the nucleation to crystal growth ratio and, ultimately, the crystal size distribution. The precipitated crystallized solid is filtered from the solution and washed with water at a temperature of between about 25° C. and 100° C. The filtered solution is recycled for further charging with feed material. The diamino zinc dichloride dissolves in water.

Very little of the hydrated zinc oxide dissolves in the water. This resultant solution then is filtered to remove the hydrated zinc oxide species. The solid hydrated zinc oxide species filtered from the solution is placed in a drying oven at a temperature of over 100° C. After a sufficient drying period, the resultant dry white powder is essentially pure zinc oxide. The filtrate from the solution is recycled for charging with additional zinc compound mixture.

The zinc oxide may be dried at approximately 100° C. To ensure that the material is free of chloride, however, it is preferable to heat the zinc oxide to a higher temperature. Diamino zinc dichloride decomposes at 271° C. and ammonium chloride sublimes at 340° C. Therefore, heating the zinc oxide to a temperature above 271° C. is useful. The drying temperature should be kept below approximately 350° C. to prevent the sublimation of significant amount of ammonium chloride. Therefore, it is preferable to dry the zinc oxide at a temperature in the range of 271° C. to 350° C. Typically, the zinc oxide should be dried in this temperature range for approximately 2 to 60 minutes, and preferably from 5 to 20 minutes. A 10 minute drying time has been found to be a satisfactory average.

As the zinc, lead and cadmium materials are amphoteric species, by using ammonium chloride solution these species will go into solution, while any iron oxide present in the feed material will not go into solution. Other solutions, such as strong basic solutions having a pH greater than about 10 or strong acidic solutions having a pH less than about 3, also can be used to dissolve the zinc, lead and cadmium species; however, if strong acidic solutions are used, iron oxide will dissolve into the solution, and if strong basic solutions are used, iron oxide will become gelatinous. The lead and cadmium can be removed from the ammonium chloride solution through an electrochemical reaction which results in the precipitation of lead and cadmium in elemental form. The difference in solubility between diamino zinc dichloride and zinc oxide in water and in ammonium chloride solutions allows the selective dissolution of the diamino zinc dichloride such that pure zinc oxide can be recovered. This also can be used in the crystallization step to improve the relative amounts of diamino zinc dichloride and zinc oxide species form. Significantly, all of the zinc can be recycled so that all of the zinc eventually will be converted into zinc oxide.

The crystallization step can be carried out continuously to increase the throughput and maximize the zinc oxide yield after the washing and drying step. The purpose of the crystallization/washing step is to produce a high purity zinc oxide of controlled particle size. This is accomplished through control of the temperature-time profile during cooling in the crystallization.

The crystallization step takes the filtrate from the cementation step at 90°–100° C. This filtrate contains the dissolved zinc with small amounts of trace impurities such as lead and cadmium. In order to prepare a pure zinc oxide it is necessary to prevent the formation of solvent inclusions inside the grown crystals. Solvent inclusions are pockets of liquid trapped as a second phase inside the crystals. Control of crystallization conditions can be employed to reduce these impurities.

Recycle

To produce pure zinc oxide from waste dust containing zinc efficiently and in a safe and cost effective way, the process recycles all zinc which is not removed from the leachate in the crystallization step. In addition, the diamino zinc dichloride which is redissolved in water in the washing step also is recycled. The recycle of zinc increases the overall zinc concentration in liquid solution in the process. This allows the crystallizer to operate at a higher temperature due to the rapid change in zinc oxide solubility with temperature in ammonium chloride solution.

The recycle has the advantage that the solution becomes saturated relative to certain materials present in the dust, such as CaO. When this occurs, CaO no longer is leached from the dust but remains with the iron in the iron cake. This increases the value of the cake. Another important advantage is that there is no liquid effluent in this process. The only products are solid (iron cake, zinc oxide, waste metals), which are then sold for use in various industrial processes. No waste is produced since all liquid is recycled.

Further Sodium Hydroxide Leach

Once the essentially pure zinc oxide has been recovered, a further zinc oxide purification process is utilized which is based on the solubility of zinc oxide in a concentrated sodium hydroxide solution. The solubility of zinc oxide in sodium hydroxide increases significantly with increasing sodium hydroxide concentration. For example, a 16 molar sodium hydroxide solution (640 g per liter) will dissolve 4 mole (320 g) of zinc oxide. If this solution is then diluted by a factor of 4, the solubility will decline so that approximately 180 g of zinc oxide/zinc hydroxide will precipitate. The zinc oxide purification process utilizes this phenomenon to produce zinc oxide which is at least 99.8% pure.

In the first step, zinc oxide is dissolved in a 50%–70% sodium hydroxide solution. Since most metals are not soluble in concentrated sodium hydroxide, most of the metal impurities in the zinc oxide will not dissolve, including manganese, iron and cadmium. Lead and calcium are soluble in concentrated sodium hydroxide and therefore will dissolve, as will chloride. The solution is then filtered to remove the undissolved materials which are then sent to the metals recovery section of the plant.

The solution then is diluted with water by a factor ranging from 3 to 30, but preferably 3 to 8, and optimally around 4, which appears to be optimum from the point of view of product recovery and energy costs. The best mode for the dilution step is performed hot at a temperature at or above 70° C. and preferably at temperatures ranging from 80° C. to 100° C. at atmospheric pressure. Temperatures below 70° C., and temperatures above 100° C. at pressures greater than atmospheric, may be used, but are not as economically advantageous as in the preferred range. The hot temperatures cause the formation of zinc oxide to be favored over the formation of zinc hydroxide. The resulting zinc oxide crystals which form are then filtered out, sent to a wash tank where they are washed with water, and then sent to a dryer where they are dried, preferably at a temperature of 160° C.

The diluted sodium hydroxide solution is then sent to an evaporator condenser where the solution is concentrated back to 50%–70% sodium hydroxide and then reused. When a steady state has been achieved, this step results in the formation of sodium chloride crystal which will be filtered out of the solution and recovered. This is because sodium chloride formed by the chloride present in the zinc oxide is less soluble in concentrated sodium hydroxide solution than in dilute sodium hydroxide. After the sodium chloride is filtered out, the concentrated solution can be reused in the purification process. Periodically, lead will be removed from the sodium hydroxide solution by cementation. This involves the addition of zinc dust which will displace the lead in solution. The lead will then be filtered out and sent to the lead recovery portion of the plant.

By controlling the rate of dilution of the sodium hydroxide solution or its method of addition during the zinc oxide crystallization step, it is possible to control the particle size hence the surface area of the zinc oxide produced. Furthermore, it should be observed that the zinc oxide purification process is not limited to the purification of zinc oxide recovered by the zinc oxide recovery process of the present invention and can be used to purify zinc oxide provided from any source.

Additionally, by selecting the method of addition of the intermediate solution, preferably sodium hydroxide, during the zinc oxide crystallization step, it is possible to control the particle size hence the surface area of the zinc oxide produced. It has been found that the smaller the droplet size in which the solution is added, the smaller the particle size (larger surface area). By dispersing the sodium hydroxide into droplets by a hydraulic atomizer, the particle size can be controlled. Additionally, at a constant droplet size, vigorous mixing will result in a larger surface area. The principle can be employed through selection of the appropriate droplet size and amount of mixing, to obtain highly purified zinc oxide with a predetermined surface area. This general relationship is shown in Table III.

TABLE III

| Approximate Droplet Size | Approximate Surface Area |
| --- | --- |
| 250 microns | 2.0 m$^2$/g |
| 180 microns | 3.0 m$^2$/g |
| 150 microns | 4.0 m$^2$/g |
| 100 microns | 10.0 m$^2$/g |

As the concentration of the sodium hydroxide increases, the number of moles of zinc oxide which can be dissolved in the sodium hydroxide solution increases. As the sodium hydroxide solution is diluted, the number of moles which can be dissolved in the solution decreases, i.e., the zinc oxide in the solution begins to precipitate. This solubility characteristic of zinc oxide in sodium hydroxide is used by the present invention to purify zinc oxide by first dissolving the zinc oxide in a highly concentrated solution of sodium hydroxide and filtering out the impurities which do not dissolve, and then by diluting the sodium hydroxide solution to cause the zinc oxide to precipitate. By controlling the rate of dilution, the particle size and surface area of the zinc oxide produced can be controlled.

A hold tank maintains a 50%–70% NaOH solution at 120° C. to 150° C. The zinc oxide-containing product to be purified is dissolved in the concentrated NaOH solution in a digestion tank, which solution is delivered to the digestion tank from the hold tank. The undissolved impurities are filtered out in a tramp press and the concentrated solution containing the zinc oxide is delivered to a precipitation tank. The solution contained in the precipitation tank then is diluted at a predetermined rate with distilled water. As discussed above, preferably the dilution takes place at a temperature ranging from 70° C. to 100° C., and preferably from 80° C. to 100° C., so that the formation of zinc oxide as opposed to zinc hydroxide is favored. The zinc oxide crystal precipitates due to the decreasing solubility of zinc oxide as the NaOH solution is diluted. The zinc oxide crystal is then filtered and washed with water in a press. The zinc oxide crystal is then dried, preferably at approximately 160° C., in a drier.

The diluted solution, after the zinc oxide crystal has been filtered out, is collected in a feed tank from which it is delivered to an evaporator condenser which concentrates the solution back to 50%–70%. When steady state is achieved, sodium chloride crystals will form which are filtered out in a press as the re-concentrated NaOH solution is delivered back to the hold tank for reuse in the purification process. Periodically, lead will be removed from the NaOH solution by cementation by adding zinc dust which displaces the lead in solution. The lead will be filtered out and sent to the lead recovery portion of the plant. The purified zinc oxide can be ground, sized and bagged 26.

Production of Zinc Compounds from Zinc Oxide

Zinc oxide can be used to make a number of other zinc compounds. This is the basis for subprocess 300. Those include, zinc acetate, zinc borate, zinc bromate, zinc carbonate, zinc chloride, zinc chromate, zinc hydroxide, zinc nitrate, zinc phosphate, zinc stearate, zinc gluconate, zinc sulfate, and zinc EDTA salt. This list is not exhaustive and many other zinc compounds can be made by adding the appropriate reactants to the zinc oxide slurry.

Commercial zinc oxide is usually made by combustion of zinc vapor in air and is collected as a dry powder. The zinc oxide prepared as described herein is a precipitate in aqueous solution. This allows a range of downstream chemicals to be manufactured by addition of the appropriate acid to the zinc oxide slurry. Well known methods of producing zinc compounds by the addition of the appropriate acid can be used in the current invention.

The zinc compounds can be manufactured directly without having to suspend or dissolve the dry zinc oxide. Synthesis of zinc compounds by this method also obviates the need to dry zinc oxide obtained from the purification process described above. Both simple commodity chemicals and specialty products having a particular physical or chemical properties can easily be made by employing this process in conjunction with the methods to control particle size of the zinc oxide described above.

Although the present invention has been described in accordance with particular embodiments, it will be apparent to those skilled in the art that the embodiments discussed above are merely exemplary and that modifications can be made to the processes discussed above which are within the spirit and scope of the present invention.

What is claimed is:

1. A method for producing a more concentrated iron product from an iron-bearing waste materials stream generated from a steelmaking or ironmaking furnace, which waste materials stream comprises iron compounds and non-iron compounds, comprising the steps of:

a. subjecting the waste materials stream to a first compacting process whereby the waste materials stream is compacted into a compacted waste materials stream;

b. roasting the compacted waste materials stream to a temperature greater than about 980° C. in a reducing atmosphere to convert at least a portion of the iron compounds in the waste materials stream into a direct reduced iron product comprising iron and non-iron compounds and fuming off at least a portion of the non-iron compounds;

c. providing the direct reduced iron product to a crushing process whereby at least a portion of the direct reduced iron product is crushed into particles of one-half inch mesh size or smaller;

d. subjecting the direct reduced iron product to a separation process whereby a first portion of the direct reduced iron product comprising a portion of the iron compounds is separated from the remainder of the direct reduced iron product comprising a portion of the iron and the non-iron compounds; and then e. recovering the first portion of the direct reduced iron product as the more concentrated iron product.

2. The method of claim 1, further comprising the step of subjecting at least a portion of the first portion of the direct reduced iron product to a second compaction process.

3. The method of claim 1, further comprising the step of providing at least a protion of the crushed waste materials stream directly to a furnace.

4. The method of claim 1, wherein said separation process is a magnetic separation process.

5. The method of claim 1, wherein said separation process is a flotation separation process.

6. The method of claim 1, further comprising the step of capturing at least a portion of the non-iron compounds and subjecting the captured non-iron compounds to subsequent processing steps to recover chemical and metal values.

7. The method of claim 6, wherein said subsequent processing steps include leaching the captured non-iron compounds in a solution selected from the group consisting of ammonium chloride, sodium hydroxide, ammonium sulfate, ammonia/ammonium hydroxide, ammonium phosphate, potassium hydroxide, ammonia/ammonium oxalate, and ammonia/ammonium carbonate solutions.

8. The method of claim 1, further comprising the step of combining the waste materials stream with a secondary waste materials stream which comprises iron rich constituents.

9. The method of claim 1, wherein a carbon compound is added to the waste materials stream during the first compaction process.

10. The method of claim 9, wherein said first compaction process operates at a temperature of between approximately 10° C. and 250° C.

11. The method of claim 10, wherein the first compaction process is a first briquetting process.

12. The method of claim 1, further comprising the step of providing the first portion of the direct reduced iron product to another furnace, wherein the first portion of the direct reduced iron product is heated to a temperature sufficient to liquefy the first portion of the direct reduced iron product, and removing at least a portion of any non-iron compounds contained in the first portion of the direct reduced iron product stream as slag.

13. The method of claim 1, further comprising the step of providing the first portion of the direct reduced iron product to a steelmaker for use as an iron feedstock in the production of iron-based products.

14. A method for producing a more concentrated iron product from an iron-bearing waste materials stream generated from a steelmaking or ironmaking furnace, which waste materials stream comprises iron compounds and non-iron compounds, comprising the steps of:

a. subjecting the waste materials stream to a separation process whereby a first portion of the waste materials stream comprising a portion of the iron compounds is separated from the remainder of the direct reduced iron product comprising a portion of the iron and the non-iron compounds;

b. subjecting the first portion to a first compaction process whereby the waste materials stream is compacted into a compacted waste materials stream;

c. roasting the compacted waste materials stream to a temperature greater than about 980° C. in a reducing atmosphere to convert at least a portion of the iron compounds in the waste materials stream into a direct reduced iron product comprising iron and non-iron compounds and fuming off at least a portion of the non-iron compounds;

d. providing the direct reduced iron product to a crushing process whereby at least a portion of the direct reduced iron product is crushed into particles of one-half inch mesh size or smaller; and then e. recovering the first portion of the direct reduced iron product as a more concentrated iron product.

15. The method of claim 14, further comprising the step of providing at least a protion of the crushed direct reduced iron product directly to a furnace.

16. The method of claim 14, wherein said separation process is a magnetic separation process.

17. The method of claim 14, wherein said separation process is a flotation separation process.

18. The method of claim 14, further comprising the step of capturing at least a portion of the non-iron compounds and subjecting the captured non-iron compounds to subsequent processing steps to recover chemical and metal values.

19. The method of claim 18, wherein said subsequent processing steps include leaching the captured non-iron compounds in a solution selected from the group consisting of ammonium chloride, sodium hydroxide, ammonium sulfate, ammonia/ammonium hydroxide, ammonium phosphate, potassium hydroxide, ammonia/ammonium oxalate, and ammonia/ammonium carbonate solutions.

20. The method of claim 14, further comprising the step of combining the waste materials stream with a secondary waste materials stream which comprises iron rich constituents.

21. The method of claim 14, wherein a carbon compound is added to the waste materials stream during the first compaction process.

22. The method of claim 21, wherein said first compaction process operates at a temperature of between approximately 10° C. and 250° C.

23. The method of claim 22, wherein the first compaction process is a first briquetting process.

24. The method of claim 14, further comprising the step of providing the first portion of the direct reduced iron product to another furnace, wherein the first portion of the direct reduced iron product is heated to a temperature sufficient to liquefy the first portion of the direct reduced iron product, and removing at least a portion of any non-iron compounds contained in the first portion of the direct reduced iron product as slag.

25. The method of claim 14, further comprising the step of providing the first portion of the direct reduced iron product to a steelmaker for use as an iron feedstock in the production of iron-based products.

* * * * *